Feb. 18, 1969   J. E. CHAMBERS   3,428,342
CONNECTION FOR SHEET METAL DUCTS
Filed Feb. 28, 1968
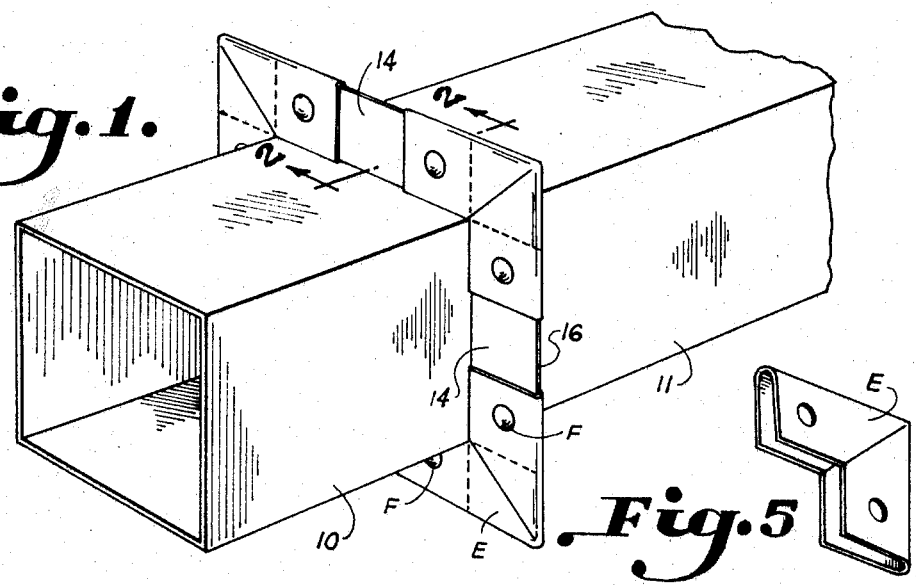
Fig. 1.
Fig. 5.
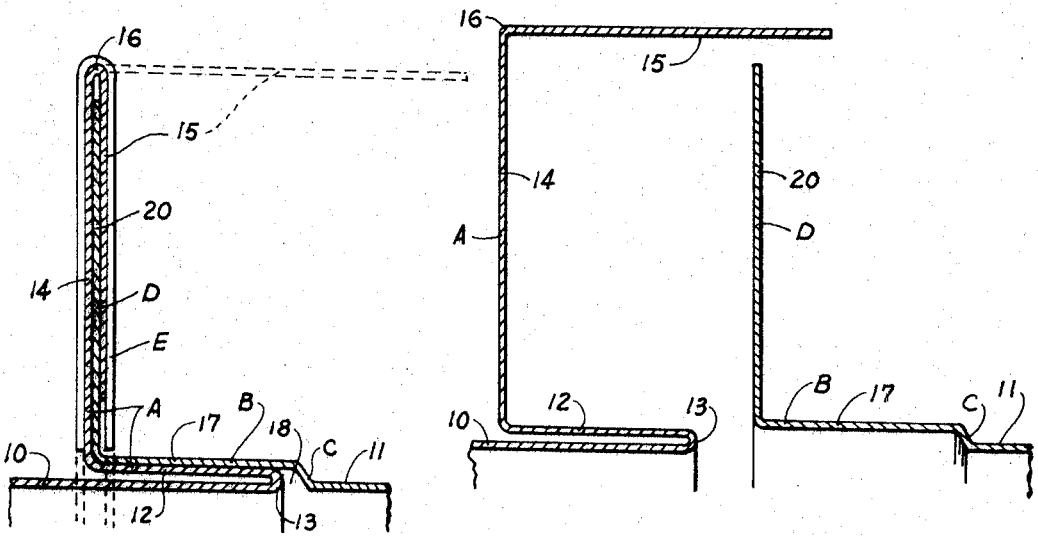
Fig. 2.
Fig. 3.
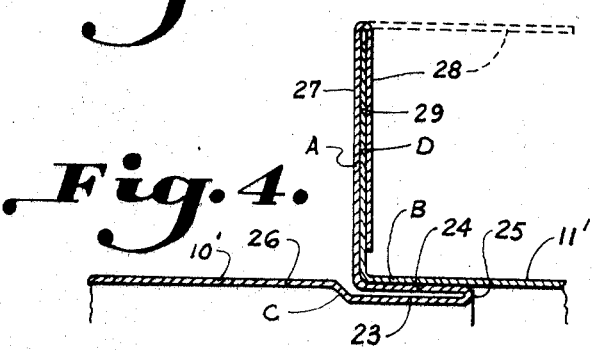
Fig. 4.
INVENTOR.
JOHN E. CHAMBERS
BY
Bailey & Dority
ATTORNEYS

United States Patent Office

3,428,342
Patented Feb. 18, 1969

3,428,342
CONNECTION FOR SHEET METAL DUCTS
John E. Chambers, 323 Parkins Mill Road,
Greenville, S.C. 29607
Filed Feb. 28, 1968, Ser. No. 709,125
U.S. Cl. 285—399                                    1 Claim
Int. Cl. F16e *23/00, 21/06*

ABSTRACT OF THE DISCLOSURE

A support member including an underlying flange portion folded back 180° integral with a leading edge of one duct, and an outwardly extending flange portion carried integrally with a leading edge of said underlying flange at a right angle thereto, is provided with a locking portion carried integrally with a leading edge of the outwardly extending flange portion. A receiving flange member is carried integrally with and parallel to each of the sides of the other of the ducts conforming to and receiving said underlying flange portion. A connecting wall extends outwardly integral with a leading edge of a duct. A locking portion is folded downwardly over an outwardly projecting abutment wall carried by each receiving flange member. An angle member and fastening means secure each corner of the connection.

---

This invention relates to improvements in ducts or pipes of the type commonly formed of sheet metal and employed to conduct air for heating, ventilating, air conditioning, and the like. More particularly, the invention pertains to joints for sheet metal ducts and the like.

Many attempts have been made to provide sheet metal ducts with simple efficient connections. Such is exhibited in U.S. Patent No. 574,743, E. J. Mallen, wherein separate folded fittings are positioned upon one duct to fold over the flange of an adjacent duct. Such leaves a ragged inwardly projecting edge which, for example catches lint if used in a textile mill, producing a pressure drop. Such connection is also subject to "shelving" or collapsing diagonally and presents little resistance to forces tending to pull the joint apart. Connections such as contemplated by U.S. Patent No. 1,484,491, J. J. Gutermann, would require separate fastening members for each size duct and would not effectively resist shelving in any direction.

The main objective of the invention is to reduce the relatively great amount of manual labor and time presently required to construct joints for rectangular sheet metal ducts by conventional crude cut and fit methods. According to the invention, the improved joint forms an integral part of the ducting and is prefabricated to a great extent during the manufacturing of the ducting, thereby eliminating almost entirely the use of separate flanges and joint forming elements.

Another important object of the invention is to provide a duct or pipe joint for sheet metal work which is much stronger than conventional joints, substantially gas-tight, easy to assemble without the requirement for skilled labor, and neat and uniform because of prefabrication with dies as an integral part of duct sections.

Still another object is to provide a joint which essentially slips together and requires only a simple bending over of one flange on each side of the duct for substantial completion.

Another object is to provide a joint of the above-mentioned character which is corner reinforced in a convenient manner.

Another object is to provide a joint for sheet metal ducts and the like which will not impede the flow of air therethrough.

The construction designed to carry out the invention will be hereinafter described, together with other features thereof.

The invention will be more readily understood from a reading of the following specification and by reference to the accompanying drawing forming a part thereof, wherein an example of the invention is shown and wherein:

FIGURE 1 is a perspective view of a connection or joint between a pair of typical sheet metal duct sections according to the invention, FIGURE 2 is an enlarged fragmentary vertical section taken on line 2—2 of FIGURE 1, FIGURE 3 is a similar sectional view through the joint before assembly, FIGURE 4 is a vertical cross sectional view showing a modification, and FIGURE 5 is a corner reinforcing cap utilized on both forms of the invention.

The drawing illustrates a connection for the adjacent ends of two rectangular sheet metal air ducts and the like having sides, wherein the ducts connected are of the same cross section. A support member A is carried by each of the sides at an adjacent end of one of the ducts. Each support member includes an underlying flange portion folded back 180° integral with a leading edge of said one duct, an outwardly extending flange portion carried integrally with a leading edge of said underlying flange at a right angle thereto, and a locking portion carried integrally with a leading edge of said outwardly extending flange portion. A receiving flange member B is carried integrally with and parallel to each of the sides of the other of the ducts conforming to and receiving said underlying flange portion. A connecting wall C extends outwardly slightly further than two thicknesses of sheet metal integral with a leading edge of a duct carrying a member integrally at the leading edge thereof. An outwardly projecting abutment wall D is carried integrally with a leading edge of each said receiving flange member at a right angle thereto. The locking portion is folded downwardly over each said outwardly projecting abutment wall. A separate angle member E conforming to and bridging adjacent edges of said outwardly extending flanges, said locking members and said outwardly projecting abutment walls. Fastening means F secure each angle member and each adjacent edge.

In the drawing wherein for the purpose of illustration are shown preferred embodiments of the invention, attention is directed first to FIGURES 1 through 3 and 5, in which the numerals 10 and 11 designate a pair of adjacent rectangular sheet metal duct sections which it is desired to join in end-to-end substantially air tight relation. Toward this end, there is provided on each side of the duct 10 a support member A including a reversely bent flange 12 which lies close to and parallel to the outer face of the adjacent duct side wall, as shown clearly in FIGURE 2. The flange 12 is integrally connected to the adjacent duct side wall by means of a U-shaped portion or bend 13, the radius of which is formed as small as possible and practical by appropriate die means. The flange 12 extends reversely on the duct 10 at an appropriate and substantial distance, depending upon the overall size of the duct.

At its reverse end, the flange 12 carries an integral outwardly or radially extending flange 14 integral therewith and extending at right angles thereto and also at right angles to the duct proper. Both of the flanges 12 and 14 extend for the entire width of the adjacent side wall of the duct 10, and it should be understood that an identical construction is provided upon each of the multiple side walls of the duct to form the complete joint illustrated in FIGURE 1. At its outer extremity, the radial flange 14 carries a forwardly or longitudinally projecting lip or locking member 15 formed integral therewith by a suitable corner bend 16. The lip 15 is somewhat shorter than the radial width of flange 14, and the latter is correspondingly wider than the flange 12, as clearly shown in the drawing. The lip 15 as initially formed, FIGURE 3, is parallel to the flange 12 and to the duct axially. During manufacturing of the duct section 10, the elements 12, 14 and 15 are formed on the four sides of the duct mechanically by appropriate dies or forming processes. Thus, the major elements of the joint or connection are prefabricated with the ducting and the use of separate connecting parts is eliminated almost entirely along with most of the manual labor commonly employed in this work. Additionally, the invention provides uniformity, neatness, close fits and great economy, all of which elements are highly desirable. Conventional practices require considerable skill and manual labor and frequently result in awkward, uneven and unsightly joints and other deficiencies.

The companion duct section 11 is provided on each side thereof, and at one end with a receiving flange member B including an outwardly struck or offset flange 17 adapted to telescope over the adjacent flange 12 with a slip fit. As best shown in FIGURE 2, the flange 17 is slightly longer than the underlying flange 12 so that in assembly there is a gap 18 between the bend 13 and the lateral connecting wall C of offset flange 17. At its leading end, the flange 17 carries an integral outwardly projecting abutment wall 20 integral therewith and disposed at right angles thereto and parallel to the flange 14. The abutment wall 20 is somewhat narrower radially than the flange 14 so as to be able to engage beneath or inside of the lip 15 when the joint is telescoped together, as illustrated in FIGURE 2. When so telescoped, the abutment wall 20 engages against the radial flange 14 and the offset flange 17 snugly overlies the flange 12 so as to form substantially a gas-tight joint on the particular side of the duct.

When this condition prevails at each side of the polygonal duct, each lip 15 is bent downwardly by suitable means in the manner indicated in FIGURE 2 so as to overlie the abutment wall 20 and lock or sandwich the same snugly in between the flange 14 and the lip 15. This substantially completes the duct joint on each side of the duct, and it may be seen from FIGURE 2 that the radially projecting portion of the joint is of triple thickness for strength and rigidity and the offset portion of the joint parallel to the duct axis including flanges 12 and 17 and the adjacent duct wall is also of triple thickness for strength and rigidity. The interior air passage of the duct is unobstructed as shown clearly in FIGURE 2, and there is no interference with the flow of air or gas in the duct because of the joint.

To perfect and finish the duct joint, a prefabricated separate angle member or sheet metal corner cap E is driven onto each corner of the joint where each pair of sides of the duct intersect. Each L-shaped corner cap E is preferably U-shaped in cross section, as shown, and fits snugly over adjacent end portions of the elements 14 and 15 as shown clearly in FIGURE 2. Each corner cap is secured by fastening means, preferably riveted to the joint by a pair of rivets F as illustrated in FIGURE 1. Sheet metal screws or other forms of fasteners may be employed, if preferred. The caps E not only reinforce the joint but also eliminate open cracks at the four corners of the joint.

The modified joint shown in FIGURE 4 is basically the same as in FIGURE 2 and like reference letters are employed for like parts. The same corner cap E, omitted in FIGURE 4 is employed. In this figure, the duct section 10' has a longitudinal flange 23 offset inwardly as shown and immediately outwardly thereof the flange 23 carries a reversely directed extension 24 connected thereto by a U-bend 25. The extension 24 also lies slightly inwardly of the adjacent side wall 26 of duct section 10'.

The extension 24 at its rear end carries an integral radial flange 27, in turn carrying a locking lip 28 substantially identical to the previously-described lip 15 in structure and function.

The mating duct section 11' in FIGURE 4 has its end telescoping directly over the flanges 24 of duct section 10' and there is no need for any outwardly or inwardly offset portions on the side walls of the duct 11' in FIGURE 4. This renders the construction somewhat simpler and more economical, although the inwardly offset flanges 23 offer a slight impediment to air flow which is not present in the prior embodiment of the invention, but which can be tolerated without difficulty in many instances. The duct section 11' is provided with a radial abutment wall or flange 29 on each side thereof for sandwiching or interlocking with the elements 27 and 28 as shown in FIGURE 4 and substantially as described previously in the prior embodiment. When the locking lips 28 are bent downwardly to overlap the walls 29, FIGURE 4, the corners of the joint are completed in the same manner previously described by the application of the corner caps, not shown in FIGURE 4.

In view of the above, it is thought that the advantages of the constructions should be readily apparent to those skilled in the art without the necessity of any further description. One further advantage of the uniformly prefabricated joints over conventional cut and fit joints commonly employed is that the necessity for separately formed custom-fitted flanges and the like is eliminated. The usual practice is for a sheet metal worker on the job to split the corners of adjacent duct sections and bend and deform the wall end portions in various ways, usually rather crudely for telescoping or for receiving separately formed flanges which are soldered or otherwise attached. This frequently requires the matching of parts on the job, particularly where the initial work has been performed in the shop prior to transporting the work to a job site. All of this rather crude procedure is eliminated by the invention with obvious resulting economies.

While a preferred embodiment of the invention has been described using specific terms, such description is for illustrative purposes only, and it is to be understood that changes and variations may be made without departing from the spirit or scope of the following claim.

What is claimed is:

1. A connection for the adjacent ends of two rectangular sheet metal air ducts and the like having sides, wherein the ducts connected are of the same cross section comprising: a support member carried by each of the sides at an adjacent end of one of the ducts, each support member including an underlying flange portion folded back 180° integral with a leading edge of said one duct, an outwardly extending flange portion carried integrally with a leading edge of said underlying flange at a right angle thereto, and a locking portion carried integrally with a leading edge of said third outwardly extending flange portion; a receiving flange member carried integrally with and parallel to each of the sides of the other of the ducts conforming to and receiving said underlying flange portions; a connecting wall extending laterally slightly further than two thicknesses of sheet metal integral with a leading edge of a duct carrying a member integrally at the leading edge thereof; an outwardly projecting abutment wall carried integrally with a leading edge of each said receiving flange at a right angle thereto, said locking portion being folded downwardly over each said outwardly projecting abutment wall; a separate angle member conforming to and bridging adjacent edges of said outwardly extending flanges, said locking members and said outwardly projecting abutment walls; and fastening means securing each angle member and each adjacent edge.

(References on following page)

References Cited

UNITED STATES PATENTS

| | | | |
|---|---|---|---|
| 574,743 | 1/1897 | Mallen | 285—424 X |
| 1,437,937 | 12/1922 | Gray | 285—424 X |
| 1,935,690 | 11/1933 | Zack | 285—331 |
| 3,199,901 | 8/1965 | Jeppsson | 285—424 X |
| 3,357,722 | 12/1967 | Howard | 285—424 X |

FOREIGN PATENTS 1,003,065  3/1952  France.

CARL W. TOMLIN, *Primary Examiner.*

WAYNE L. SHEDD, *Assistant Examiner.*

U.S. Cl. X.R.

285—406, 424